United States Patent [19]

Chen et al.

[11] Patent Number: 4,571,764

[45] Date of Patent: Feb. 25, 1986

[54] MULTI-PURPOSE ELECTROTECHNOLOGICAL PLIERS

[76] Inventors: Ching-Wen Chen, No. 29-1, Lu-Ti St.; Ching-Jen Chen, No. 33-1, Lu-Ti St., both of Panchiao, Taipei Hsien, Taiwan

[21] Appl. No.: 700,713

[22] Filed: Feb. 12, 1985

[51] Int. Cl.[4] .............................. B25F 1/00; B25B 7/22
[52] U.S. Cl. ............................................ 7/107; 7/132
[58] Field of Search .................... 7/132, 133, 134, 107

[56] References Cited

U.S. PATENT DOCUMENTS

| | | | |
|---|---|---|---|
| 119,837 | 10/1871 | Forbes | 7/133 |
| 838,008 | 12/1906 | Chadler et al. | 7/134 |
| 3,525,107 | 8/1970 | Hays | 7/107 |

Primary Examiner—Frederick R. Schmidt
Assistant Examiner—Maurina T. Rachuba
Attorney, Agent, or Firm—Jeffers, Irish & Hoffman

[57] ABSTRACT

The double-sided plier with parts including a pair of handle bars, a body, a T member slideable relative to the body member, in which the T member has portions confronting a straight upper edge of the body and therebetween the stripping cutter and the terminal pressing member are mounted with respect to the two sides of the transverse section of the T member, their functions can be effected when operating the handle bars. The body is formed with notches extended inwardly from two side thereof, a fixed tool member and a movable tool member associated therewith are provided with shearing surfaces pressing surfaces which extend across the notches respectively, the fixed tool member and the movable tool member are mounted in a manner that they can be driven by the handle bars with a pivoting motion to cutting wires or pressing either isolated or bare terminals of wires.

6 Claims, 6 Drawing Figures

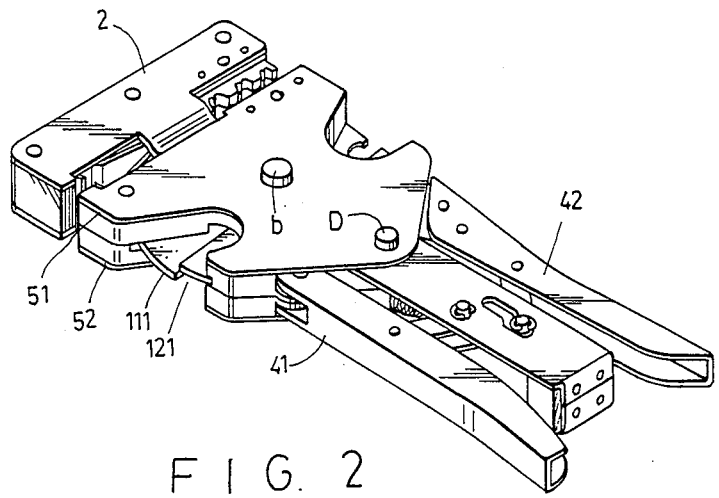
F I G. 2
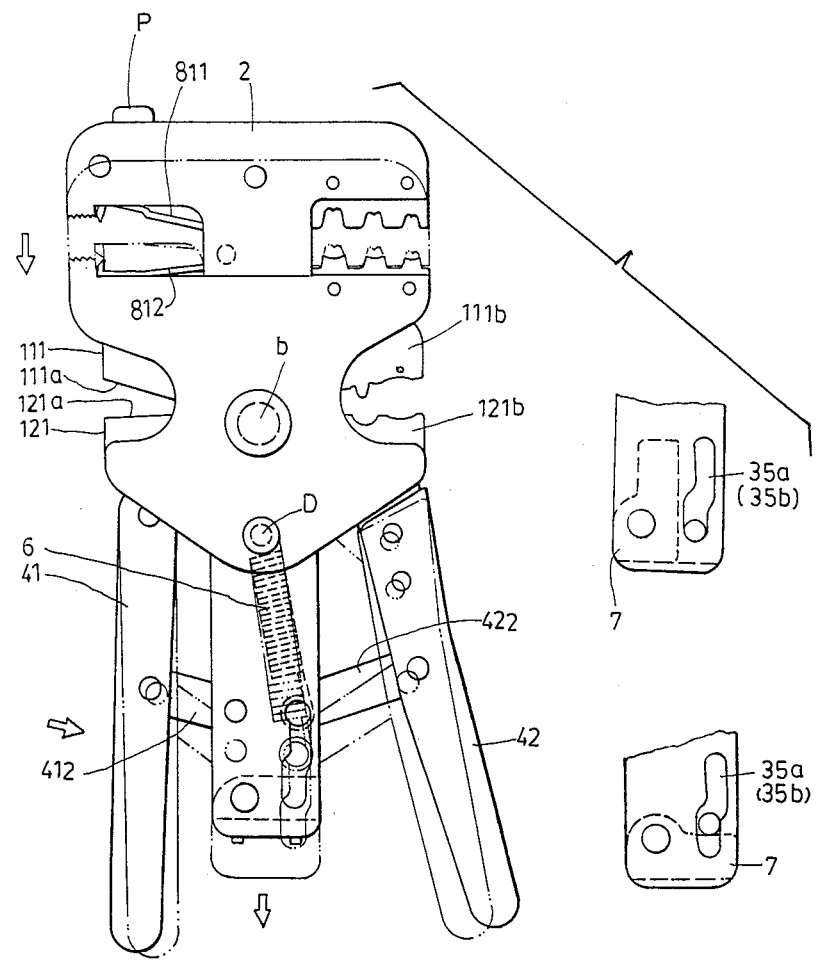
F I G. 3

MULTI-PURPOSE ELECTROTECHNOLOGICAL PLIERS

BACKGROUND OF THE INVENTION

This invention relates to a hand tool for application in the electrotechnological field and more particularly concerns pliers for cutting or stripping electrical wires and pressing joining terminals.

Various kinds of hand tools have been provided for electrotechnological work, an example being the stripping pliers which are usually used to perform simple or double functions of stripping and/or cutting wires. The conventional simple function stripping pliers normally include a fixed handle, a movable handle, a fixed jaw, a movable jaw, a pair of stripping cutters and sometimes a pair of shear blades, so an isolated wire can be gripped by the fixed and movable jaws to provide a starting point for the stripping action, and then stripped with the stripping cutters moving in a direction away from the point where the wire is gripped. The linkage of the mechanism for effecting such a two step operation normally includes at least two pivot points.

In addition, most pliers are of a one-sided construction and fail to maximize the utilization potential of this particular type of tool.

SUMMARY OF THE INVENTION

Accordingly, it is a main object of this invention to provide pliers by which the stripping action thereof is achieved partly by a longitudinal sliding movement and a pivot movement of a part associated with the stripping cutters.

Another object of this invention is to provide a plier having tooling surfaces on two sides thereof for different purposes.

It is a further object of this invention to provide pliers which, with the provision of an offset guiding slot, can perform the movements of the stripping cutters in contrary orders.

These objects are achieved by pliers which are comprised of first and second body members, each having an upper end, and two opposite sides having first and second notches respectively; first and second cover members for securing the upper and lower body members therebetween; first and second T-shaped members respectively confined between the first cover member and the first body member, and the second cover member and the second body member, which are capable of moving relative to the first and second body members and each comprising a transverse section and a longitudinal section, with the transverse sections maintained above the upper ends of the first and second body members, the longitudinal sections respectively provided with a longitudinal offset guiding slot having an upper extremity, a lower extremity and a bent portion, the transverse section having a free upper side and a lower side confronting the upper ends of the body members; a fixed tool member secured with the second body member; a movable tool member mounted with the first body member and pivotable relative thereto about a first pivot axis passing through the first and second body members and the first and second T-shaped members, the fixed tool member and movable tool member having tooling surfaces extending across the first and second notches of the first and second body members; a first handle bar pivoted with the second body member at a second pivot; a second handle bar secured with the movable member; a first link lever interconnecting the first handle bar and the T-shaped members; a second link lever interconnecting the second handle bar and the T-shaped members, which has a first end pivoted to the second handle bar and a second end; a sliding pin passing through the longitudinal offset guide slots for fastening the second end of the second link lever and the T-shaped members; and a compression spring member having an end connected with the sliding pin to bias it to the upper extremity of the longitudinal offset guiding slots, the other end thereof connected with the first and second cover members, whereby when operating the first and second handle bars, the first and second T-shaped members can be moved downwards relative to the first and second body members with the movement of the sliding pin along the longitudinal offset guiding slots.

According to an aspect of the invention, the fixed tool member and the movable tool member have portions extended across the first notches of the body members and provided with shearing blades, and other portions extended across the second notches of the body members and provided with confronting pressing surfaces.

According to another aspect of the invention, there is provided a stripping cutter on one side relative to the longitudinal sections of the T-shaped members, including a lower cutting surface and a movable upper cutting surface pivoted which are mounted between the upper ends of the body members and the lower sides of the transverse sections of the T-shaped members, the upper cutting surface when secured being normally biased away from the lower cutting surface; and a terminal pressing member is mounted between the upper ends of the body members and the lower sides of the transverse sections on the other side relative to the longitudinal sections of the T-shaped members, including a lower terminal press surface secured to the upper ends of the body members, and an upper terminal press surface secured to the lower sides of the transverse section.

According to a further aspect of the invention, the stripping member is mounted with respect to one side of the longitudinal sections of the T-shaped members.

According to a still further aspect of the invention, an adjustable block is pivotably mounted relative to the longitudinal offset slots between the pair of T-shaped members and is capable of moving turned between a vertical position and a transverse position cross to the longitudinal offset slots to provide a stiffened bearing surface against the sliding pin when operating the handle bars.

These and other objects, features and advantages of the present invention will be more apparent in the following description of a preferred embodiment with reference to the accompanying drawings, in which:

BRIEF DESCRIPTION OF THE DRAWINGS

FIG. 2 is a perspective view of the plier as shown in FIG. 1;

FIG. 3 is a schematic view showing the movement of a sliding pin in the guide slot and relative movements of the link lever;

DETAILED DESCRIPTION OF THE PREFERRED EMBODIMENT

Figure 1:
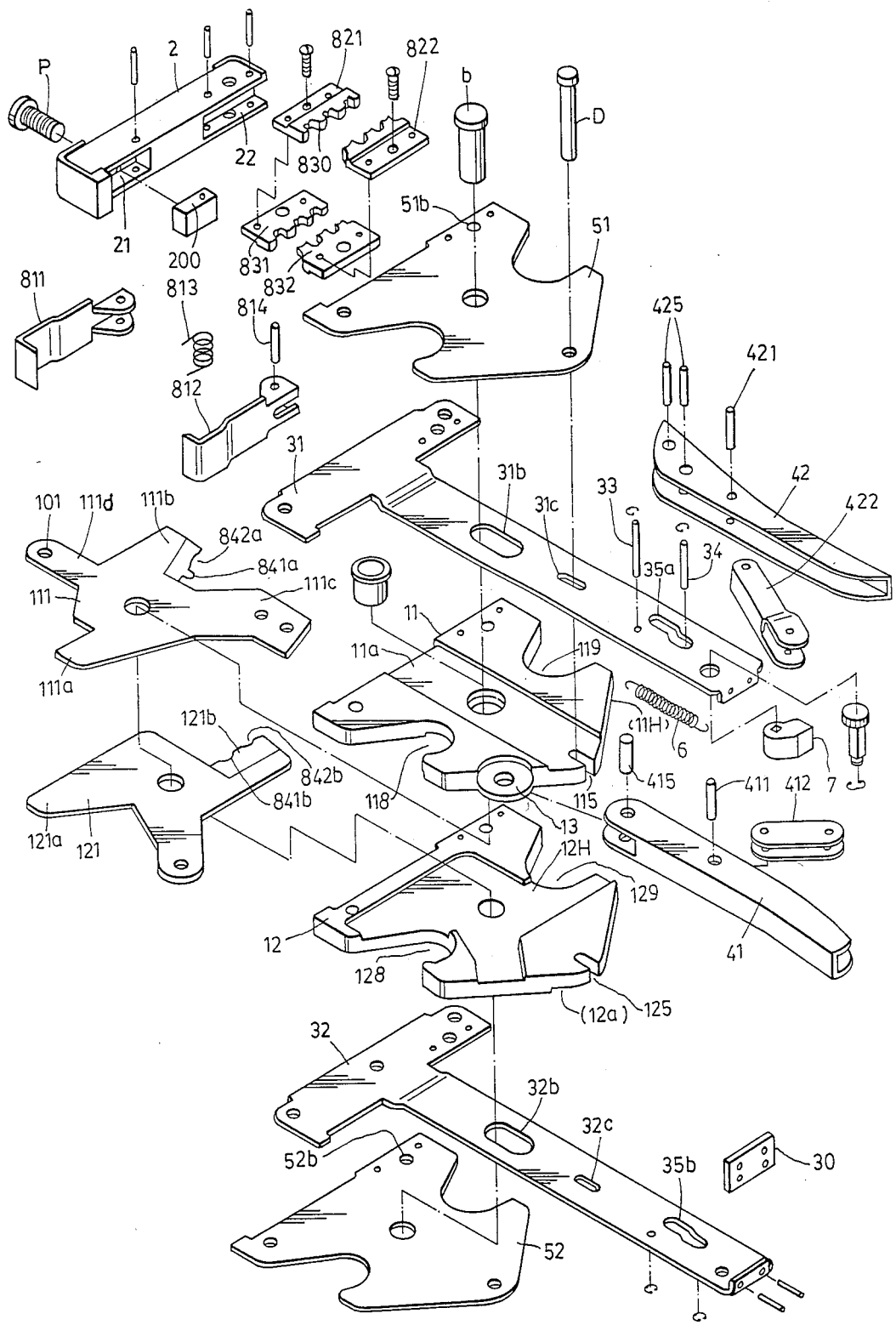
FIG. 1 is an exploded view of multi-purpose plier contructed according to the invention.

Referring now to FIG. 1, the components of the pliers embodied with the invention are shown in an exploded state.

Pliers according to one preferred embodiment of the invention comprises a pair of body members 11 and 12 one disposed on the other, which can be formed of plastics with corresponding shapes, with each of them provided with two slots 118, 119 and 128, 129, respectively, at the opposite sides thereof. On the exposed surfaces of the body members 11 and 12 there are milled recesses 11a and 12a for fitting therein a pair of T-shaped members 31 and 32 which are slideable relative thereto respectively. In addition, there are slits 115 and 125 formed on the lower ends of the body members 11, 12 and normally registered with the upper elongated pin holes 31c, 32c.

A pair of cover plates 51, 52 are attached onto the opposite surfaces of the assembled T-shaped members 31, 32, and secured with the body members 11, 12 by pins 51b, 52b, such that the T-shaped members 31, 32 are restrictively slideable in the space defined by the recesses 11a, 12a between the cover plates 51, 52 and the corresponding body members 11, 12, respectively. The rear ends of the pair of T-shaped members 31, 32 are secured by an end piece 30.

Between the transverse sections of the pair of T-shaped members 31, 32, there is a mounting member 2 secured therewith which is movable with the T-shaped members 31, 32. The mounting member 2 is provided with two hollows 21, 22 on the left side and the right side with respect to the transverse sections of the T-shaped members 31, 32, and with respect to the two sides of the longitudinal sections.

The pliers according to this invention are equipped with four kinds of tooling members with different functions. Between the body members 11, 12, there is a first pair of tool members 111, 121, and each has opposite tooling surfaces 111a, 121a and 111b, 121b on spaced apart positions thereon. The fixed tool member 121 is placed in a hollowed portion 12H formed on the upper surface of the lower body member 12 with a shape substantially complementary to the tool member 121, so that the tool member 121 is prevented from movement relative to the body member 12.

The under surface of the first body member 11 is formed with a hollowed portion 11H (not seen in the Figure) having a shape capable of receiving the first movable tool member 111, but permitting the pivotal movement of the same, so that by means of the pivotal movement of the first movable tool member 111 relative to the first fixed tool member 121. A wire, when placed between the shearing surfaces thereof, can be cut by a shearing action resulting from the movable tool member 111 pivotally moving past the fixed tool member 121.

The first movable tool member 111 is pivoted with the first fixed tool member 121 through a sleeved pin b which penetrates the T-shaped members 31, 32, the cover plates 51, 52 and the body members 11, 12. Because the pin b is passed through the T-shaped members 31, 32 through the upper slots 31b, 32b thereof, the movement of T-shaped members 31, 32 relative to the body members 11, 12 is determined by the length of the upper elongated slots 31b, 32b, which correspond to the lengths of the middle slots 31c, 32c and the lower offset slots 35a, 35b.

As was mentioned before, in this embodiment a pair of shearing surfaces 111a, 121a are formed on the left side viewed from the Figures of the tool members 111, 121, and a pair of pressing surfaces 111b, 121b for pressing terminals are formed on the right side of the same. The pressing surfaces are contoured in a manner such that on the movable tool member 111 a projection 841a and a concave surface 842a are formed adjacently thereto, on the fixed tool member 121 a cut-out 841b for receiving the bare terminals of wires to be pressed and a concave surface 842b similar to the opposite concave surface 842a for pressing terminals having a cylindrical isolating sheath.

A stripping cutter positioned between the T-shaped members 31, 32 and the body members 11, 12 consists of a pair of stripping elements 811 and 812 which are pivotably mounted about an upwardly extending portion 111d of the movable tool member 111 through a pin 814 passing through the pin hole 101 of the portion 111d, and a torsional spring 813 which is provided with respect to the pair of stripping elements 811, 812 to normally maintain an opened position of the stripping cutter ensuring that the wires to be cut can be received in the opening thereof.

In order to adapt the stripping cutter to wires with different diameters, there is provided an adjusting means comprising a screw P and a rigid piece 200 pivoted to the mounting member 2 at one end thereof. Since the stripping element 811 is biased against the rigid piece 200, an adjustment of the screw P can vary the tightness of contact between the stripping element 811 and the rigid piece 200, and in turn, the opening of the stripping cutter can be adjusted to an extent as desired.

On the front end walls of the body members 11, 12, which confront the hollows 21, 22 of the mounting member 2, the grooves (not seen in the Figures) are formed to respectively receive portions of the upper and lower terminal pressing elements 822, 832, while the opposite pressing elements 821, 831 are partly received in the hollow 22 for co-operating with the elements 822, 832. The above terminal pressing elements are formed with several curved slots 830 in confronting surfaces, and preferably, the curved slots 830 of the upper and lower terminal pressing elements are made with different depths thus to form step at the adjoining portions of the upper and lower pressing elements. The terminal pressing member is designed for pressing the bare bronze terminal, and with the provision of the stepped struture a portion of the sheath of the wire can be held between the portions of opposite curved slots 830 of greater depth, and the conductive portion held between the portions of the same opposite curved slots 830 of lesser depth.

A first handle bar 41 is mounted between the body member 12 and the first fixed tool member 121, and is connected with the body member 12 with pin 415. The handle bar 41 has a bifurcated forward end for receiving a circular hollow portion 13 on the left bevel side of the upper body member 11. The bifurcated end is rounded and permits the first handle bar 41 to pivot about the pin 415 within a limited angular range in the direction indicated by an arrow in FIG. 3.

A first link lever 412 interconnects the first handle bar 41 and the T-shaped members 31, 32 and is pivotably held with the handle bar 41 by means of a pin 411, and similarly held with T-shaped members 31, 32 by a pin 33.

The second handle bar 42 for operating the plier is secured with a downwardly extending portion 111c of the first movable tool member 111 at one end by two pins 425. A second link lever 422 for interconnecting the second handle bar 42 and the T-shaped members 31, 32 is secured with the handle bar 42 at one end thereof by a pin 421, the other end thereof is connected with the T-shaped members 31, 32 by a pin 34 passing through the longitudinal offset slots 35a, 35b so that the pin 34 may slide along the offset slots 35a, 35b when operating the handles 41, 42, and therefore the second handle bar 42 can be swung relative to the T-shaped members 31, 32 within an angular range limited by the upper and lower extremities of the offset slots 35a, 35b. Furthermore, there is a compression spring 6 mounted between the pin 34 and a pin D to normally hold the pin 411 against the upper end of the offset slots 35a, 35b.

It can be clearly seen in FIG. 1 that the pin D is passed through the T-shaped members 31, 32 and the body members 11, 12, and through the middle elongated slots 31c, 32c and the slits 115, 125 thereof, respectively.

Figure 4:
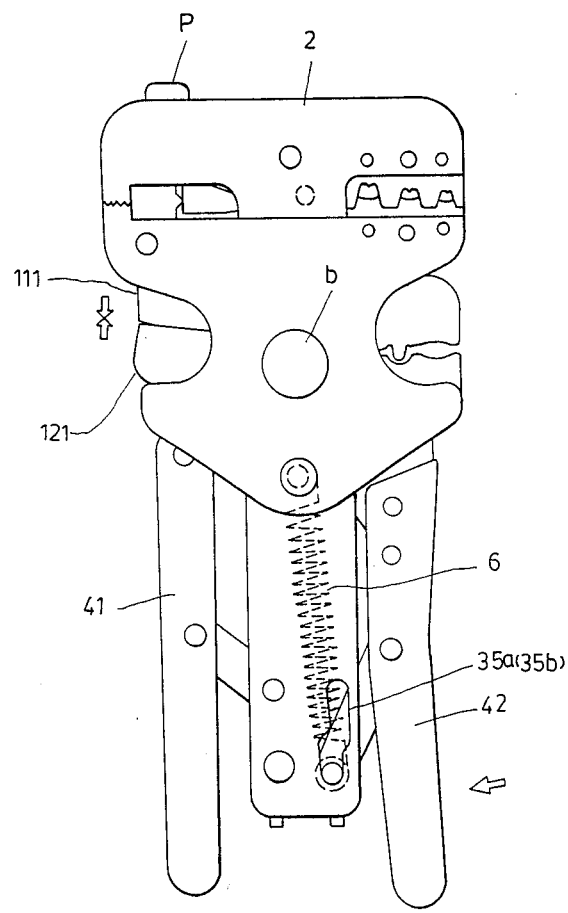
FIG. 4 is a schematic view of the plier with the sliding pin in a lower extremity of the guide slot.

The operation of these preferred pliers now will be described with reference to FIGS. 3 through 6. Firstly, referring to FIG. 3, when the handle bars 41, 42 are gripped and pressed toward each other, the link lever 42 is moved downwards along the offset slots 35a, 35b with the pivoting of pin b, and the stripping elements 811, 812 as well as the terminal pressing elements 821(831), 822(832) will be drawn into the closed positions thereof when the pin 34 is moved to the bent portion of the slots 35a, 35b as shown in FIG. 4 by phantom lines.

At this stage, to operate the first tool members 111, 121, the user must exert further force to the handle bars 41, 42, such that the pin 34 is forced to slide downwards to a further extent until it abuts against the lower end wall of the slots 35a, 35b, and where the second handle bar 42 can be swung about the pin b' and is drawn near the T-shaped members 31, 32, thus the working surfaces of the movable cutting element 111 and the upper pressing element 821 both will be brought to their opposite working surfaces respectively to effect the action of cutting wires or pressing terminals.

At the same stage when the above action occurs, the pin 814 brings the stripping elements 811, 812 to move backward with the clockwise pivotal movement of the movable tool member 111 so that the wire placed between the pair of stripping elements 811, 812 can be stripped.

Figure 5:
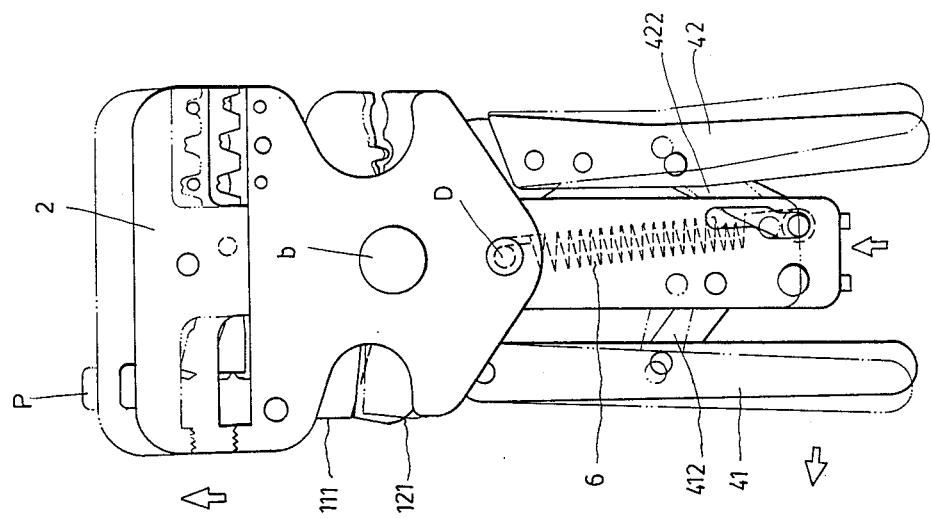
FIG. 5 is a schematic view of the plier with the sliding pin in a middle point of the guide slot.

After the stripping operation, the handle bars 41, 42 can be released by the user, and compression spring 6 thus will pull the sliding pin 34 to the bent portion of the offset slots 35a, 35b and temporarily locate on that position, with the handle bar 42 slightly rotating about the pin b due to the returning force of the compression spring 6, as shown in FIG. 5. Partially by means of the returning force of the spring 6, when an endwise push force is exerted to the T-shaped members 31, 32, the T-shaped members 31, 32 will be moved upwards, and the result of such movement, between the upper stripping surface 811 and the lower stripping surface 812, and between the upper terminal pressing element 821 and lower terminal pressing element 822 is that there are gaps respectively formed. However, the stripping cutter now still remains in a back position, as can be seen in FIG. 5.

Figure 6:
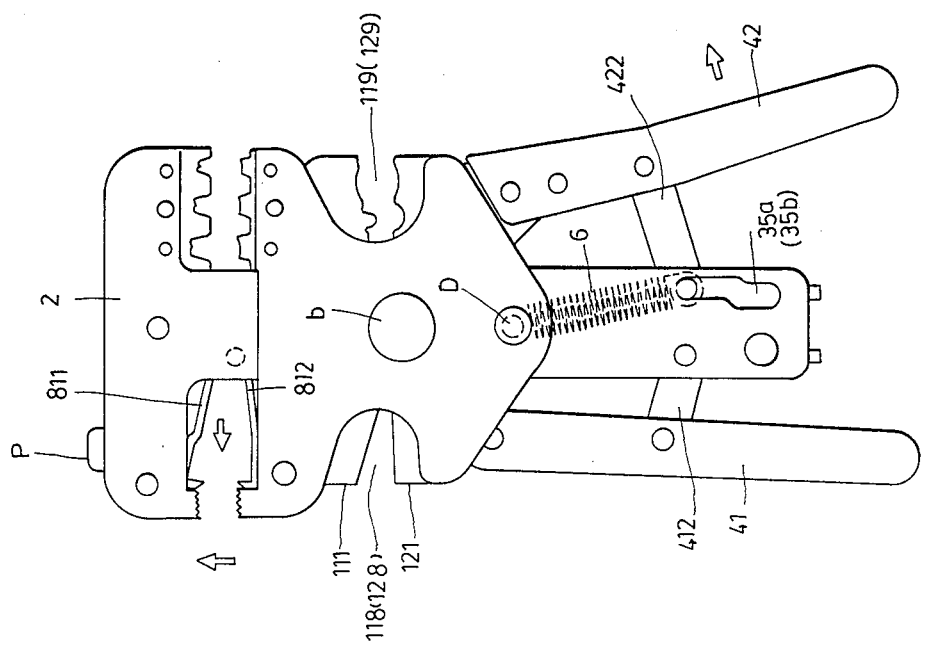
FIG. 6 is a schematic view of the plier with the sliding pin in an upper extremity of the guide slot.

As the handle bars 41, 42 are completely released, due to the returning force of the compression spring 6, the sliding pin 34 will be moved to the upper end walls of the offset slots 35a, 35b, and subsequently, the handle bar 42 can rotate about the pin b counterclockwise to its original position, so then the shearing surfaces 111a, 121a and the pressing surface 111b, 121b will be opened again, and the stripping cutter will be moved to a forward open position with the rotation of the movable tool member 111 about the pin b, as shown in FIG. 6.

It is desired to provide the area of thrust of the pliers with a rugged configuration enabling it to bear greater thrust, and in this embodiment, this is achieved by an adjustable block 7 which is pivoted between the pair of T-shaped members 31, 32 at their lower ends, as illustrated in FIG. 3, when a large thrust might be imparted by the sliding pin 34, the adjustable block 7 which can be rotated to a transverse position so as to provide a surface bearing against the thrust.

Although the present invention has been described in some detail by way of illustration and example for purposes of clarity of understanding, it will of course be understood that various changes and modifications may be made in the form, details, and arrangements of the parts without departing from the scope of the invention as set forth in the following claims.

We claim:

1. An improved multi-purpose pair of pliers, comprising:

first and second body members, each having an upper end, and two opposite sides having first and second notches respectively;

first and second cover members for securing said upper and lower body members therebetween;

first and second T-shaped members respectively confined between said first cover member and said first body member, and said second cover member and said second body member, which are capable of moving relative to said first and second body members and each comprising a transverse section and a longitudinal section, with said transverse sections maintained above said upper ends of said first and second body members, said longitudinal sections respectively provided with a longitudinal offset guiding slot having an upper extremity, a lower extremity and a bent portion, said transverse section having a free upper side and a lower side confronting said upper ends of said body members;

a fixed tool member secured with said second body member;

a movable tool member mounted with said first body member and pivotable relative thereto about a first pivot axis passing through said first and second body members and said first and second T-shaped members, said fixed tool member and movable tool member having tooling surfaces extending across said first and second notches of said first and second body members;

a first handle bar pivoted with said second body member at a second pivot;

a second handle bar secured with said movable member;

a first link lever interconnecting said first handle bar and said T-shaped members;

a second link lever interconnecting said second handle bar and said T-shaped members, which has a first end pivoted to said second handle bar and a second end;

a sliding pin passing through said longitudinal offset guide slots for fastening said second end of said second link lever and said T-shaped members; and a compression spring member having an end connected with said sliding pin to bias it to said upper extremity of said longitudinal offset guiding slots, the other end thereof connected with said first and second cover members, whereby when operating said first and second handle bars, said first and second T-shaped members can be moved downwards relative to said first and second body members with the movement of said sliding pin along said longitudinal offset guiding slots.

2. An improved multi-purpose pair of pliers as claimed in claim 1, wherein said fixed tool member and said movable tool member have portions extended across said first notches of said body members and provided with shearing blades, and other portions extended across said second notches of said body members and provided with confronting pressing surfaces.

3. An improved multi-purpose pair of pliers as claimed in claim 1, further comprises a stripping cutter including a lower cutting surface and a movable upper cutting surface pivoted therewith and mounted between said upper ends of said body members and said lower sides of said transverse sections of said T-shaped members, said upper cutting surface when secured being normally biased away from said lower cutting surface.

4. A multi-purpose pair of pliers as claimed in claim 3, wherein said stripping member is mounted relative to one side of said longitudinal sections of said T-shaped members.

5. A multi-purpose pair of pliers as claimed in claim 3, further comprises a terminal pressing member mounted between said upper ends of said body members and said lower sides of said transverse sections on the other side relative to said longitudinal sections, including a lower terminal press surface secured to said upper ends of said body members, and an upper terminal press surface secured to said lower sides of said transverse section.

6. An improved multi-purpose pair of pliers as claimed in any one of the preceding claims, further comprises an adjustable block pivotably mounted relative to said longitudinal offset slots between said pair of T-shaped member and capable of moving turned between a vertical position and a transverse position cross to said longitudinal offset slots to provide a stiffened bearing surface against said sliding pin when operating said handle bars.

* * * * *